United States Patent [19]

Takeshi et al.

[11] Patent Number: 5,079,287
[45] Date of Patent: Jan. 7, 1992

[54] OLEFIN RESIN COMPOSITION FOR INJECTION MOLDING

[75] Inventors: Shiraki Takeshi, Waki; Muraoka Kyouji, Ohshima; Hiroshige Kunie, Iwakuni, all of Japan

[73] Assignee: Mitsui Petrochemical Industries, Ltd., Tokyo, Japan

[21] Appl. No.: 267,339

[22] Filed: Nov. 4, 1988

[30] Foreign Application Priority Data

| Nov. 5, 1987 [JP] | Japan | 62-278350 |
| Nov. 5, 1987 [JP] | Japan | 62-278351 |
| Dec. 15, 1987 [JP] | Japan | 62-316902 |
| Dec. 15, 1987 [JP] | Japan | 62-316903 |

[51] Int. Cl.$^5$ ............................................. C08L 23/12
[52] U.S. Cl. .................................. 524/528; 525/240
[58] Field of Search ...................... 525/240; 524/528

[56] References Cited

U.S. PATENT DOCUMENTS

| 4,786,687 | 11/1988 | Sand | 526/903 |
| 4,792,588 | 12/1988 | Suga | 525/240 |
| 4,835,219 | 5/1989 | Tajima | 525/240 |
| 4,933,393 | 6/1990 | Toyota et al. | |

FOREIGN PATENT DOCUMENTS 0186995 7/1986 European Pat. Off.

| 47-30293 | 8/1972 | Japan. |
| 57-177036 | 4/1981 | Japan. |
| 58-008712 | 1/1983 | Japan. |
| 58-008713 | 1/1983 | Japan. |
| 59-126446 | 1/1983 | Japan. |
| 58-41309 | 9/1983 | Japan. |

*Primary Examiner*—Paul R. Michl
*Assistant Examiner*—Edward J. Cain
*Attorney, Agent, or Firm*—Sherman and Shalloway

[57] ABSTRACT

Disclosed is an olefin resin composition for injection molding, which comprises (A) an olefin resin composition comprising ultra-high-molecular-weight polyethylene having an intrinsic viscosity of 10 to 40 dl/g as measured in decalin as the solvent at 135° C. and low-molecular-weight or high-molecular-weight polyethylene having an intrinsic viscosity lower than that of the ultra-high-molecular-weight polyethylene, in which the ultra-high-molecular-weight polyethylene is present in an amount of 15 to 40% by weight based on the sum of both of the polyethylenes and the two polyethylenes as a whole have an intrinsic viscosity $[\eta]$ c of 3.5 to 15 dl/g and a melt torque T lower than 4.5 kg.cm, and (B) 1 to 70% by weight, based on the olefin resin composition, of an additive selected from the group consisting of fine particulate inorganic fillers, fibrous fillers and liquid and solid lubricants.

24 Claims, No Drawings

OLEFIN RESIN COMPOSITION FOR INJECTION MOLDING

BACKGROUND OF THE INVENTION (1) Field of the Invention

The present invention relates to an olefin resin composition for injection molding. More particularly, the present invention relates to an olefin resin composition for injection molding, which comprises an ultra-high-molecular-weight polyethylene, can be injection-molded and has excellent sliding characteristics, excellent abrasion resistance, improved heat resistance and improved rigidity in combination.

(2) Description of the Related Art

Ultra-high-molecular-weight polyethylene is excellent in impact strength, abrasion resistance, chemical resistance and tensile strength over general-purpose polyethylene and the application field of ultra-high-molecular-weight polyethylene as an engineering plastic material is being expanded. However, ultra-high-molecular-weight polyethylene has a much higher melt viscosity and a lower flowability than general-purpose polyethylene, and therefore, molding of ultra-high-molecular-weight polyethylene by ordinary extrusion molding or injection molding is very difficult. Accordingly, ultra-high-molecular-weight polyethylene is practically molded by compression molding, and on rare occasions, the polymer is molded into rods or the like at a low speed by extrusion molding.

If ultra-high-molecular-weight polyethylene inferior in the melt flowability is molded by injection molding, a shear fracture flow is generated while the resin is filled in a cavity of a mold and mica-like delamination is caused in the molded body, and therefore, a molded article exerting excellent characteristics of ultra-high-molecular-weight polyethylene cannot be obtained. Namely, the molded article is inferior to a molded article of general-purpose polyethylene.

As the injection molding method in which delamination is not caused, we previously proposed a method in which before injection molding of the resin or after completion of injection molding, the volume of a mold cavity is slightly increased and the mold is compressed to a predetermined volume (see Japanese Patent Publication No. 57-30067 and Japanese Patent Publication No. 60-58010). If this method is adopted, an injection-molded article having inherent excellent characteristics of ultra-high-molecular-weight polyethylene, such as high impact strength and high abrasion resistance, can be obtained without occurence of delamination. However, an injection molding machine provided with a mechanism for changing the volume of a mold cavity should be used for carrying out injection molding according to this method, and an injection molding machine for general-purpose polyethylene cannot be directly used.

As the method for improving the melt flowability of an ultra-high-molecular-weight polyolefin, there have been proposed various methods in which an ultra-high-molecular-weight polyolefin, is mixed with a low-molecular-weight or high-molecular-weight polyolefin.

SUMMARY OF THE INVENTION

We found that an olefin resin composition comprising ultra-high-molecular-weight polyethylene having an intrinsic viscosity of 10 to 40 dl/g as measured in decalin as the solvent at 135° C. and low-molecular-weight or high-molecular-weight polyethylene having an intrinsic viscosity lower than that of the ultra-high-molecular-weight polyethylene, in which the ultra-high-molecular-weight polyethylene is present in an amount of 15 to 40% by weight based on the sum of both of the polyethylenes, the intrinsic viscosity $[\eta]$ c of the entire composition is 3.5 to 15 dl/g and the melt torque T of the entire composition is lower than 4.5 kg.cm, can be easily molded by using a general-purpose injection molding machine without substantial decrease of excellent sliding characteristics, abrasion resistance, impact strength, chemical resistance and tensile strength inherently possessed by ultra-high-molecular-weight polyethylene, and that if a predetermined amount of an additive such as a filler is incorporated into this olefin resin composition, various properties such as heat resistance, rigidity, impact strength, self-lubricating property, abrasion resistance and moldability can be improved without substantial decrease of the most characteristic properties of the above-mentioned olefin resin composition, that is, such sliding characteristics as (1) the abrasion coefficient, (2) the dynamic friction coefficient and (3) the critical PV value.

It is therefore a primary object of the present invention to provide an ultra-high-molecular-weight polyolefin composition which can be easily injection-molded into mechanical, electric or electronic parts, for which a high precision is required, without substantial decrease of excellent mechanical properties, abrasion resistance and sliding characteristics inherently possessed by the ultra-high-molecular-weight polyolefin, and which gives a molded article improved in heat resistance, rigidity, impact strength, self-lubricating property and abrasion resistance.

Another object of the present invention is to provide a sliding material which can be easily injection-molded into a part having a high mechanical precision and gives a molded article having excellent self-lubricating property, abrasion resistance and light weight in combination.

More specifically, in accordance with the present invention, there is provided an olefin resin composition for injection molding, which comprises (A) an olefin resin composition comprising ultra-high-molecular-weight polyethylene having an intrinsic viscosity of 10 to 40 dl/g as measured in decalin as the solvent at 135° C. and low-molecular-weight or high-molecular-weight polyethylene having an intrinsic viscosity lower than that of the ultra-high-molecular-weight polyethylene, in which the ultra-high-molecular-weight polyethylene is present in an amount of 15 to 40% by weight based on the sum of both of the polyethylenes and the two polyethylenes as a whole have an intrinsic viscosity $[\eta]$c of 3.5 to 15 dl/g and a melt torque T lower than 4.5 kg.cm, and (B) 1 to 70% by weight, based on the olefin resin composition, of an additive selected from the group consisting of fine particulate inorganic fillers, fibrous fillers and liquid and solid lubricants.

Furthermore, in accordance with the present invention, there is provided a sliding material which comprises an olefin resin composition comprising ultra-high-molecular-weight polyethylene having an intrinsic viscosity of 10 to 40 dl/g as measured in decalin as the solvent at 135° C. and low-molecular-weight or high-molecular-weight polyethylene having an intrinsic viscosity lower than that of the ultra-high-molecular-weight polyethylene, in which the ultra-high-molecular-weight polyethylene is present in an amount of 15 to 40% by weight based on the sum of both of the polyethylenes and the two polyethylenes as a whole have an intrinsic viscosity $[\eta]c$ of 3.5 to 15 dl/g and a melt torque T lower than 4.5 kg.cm, and 1 to 70% by weight, based on the olefin resin composition, of a liquid or solid lubricant.

DETAILED DESCRIPTION OF THE PREFERRED EMBODIMENTS

In the composition of the present invention, ultra-high-molecular-weight polyethylene has excellent sliding characteristics such as a low abrasion coefficient, a low dynamic friction coefficient and a large critical PV value and is excellent in impact strength, tensile strength and chemical resistance, and therefore, ultra-high-molecular-weight polyethylene is an indispensable component. It is important that this ultra-high-molecular-weight polyethylene should have an intrinsic viscosity $[\eta]u$, as measured in decalin as the solvent (the intrinsic viscosity referred to herein is one determined according to this method), of 10 to 40 dl/g, especially 15 to 35 dl/g. If $[\eta]u$ is too low and below the above-mentioned range, the sliding characteristics and mechanical properties are poorer than those of ultra-high-molecular-weight polyethylene having $[\eta]u$ within the above-mentioned range. If $[\eta]u$ exceeds the above-mentioned range, even though the ultra-high-molecular-weight polyethylene is combined with a component described hereinafter, the injection moldability is degraded, and in the obtained molded article, the appearance is degraded and a flow mark or the like is formed, and laminar peeling is readily caused and abrasion resistance characteristics are degraded.

Low-molecular-weight or high-molecular-weight polyethylene having an intrinsic viscosity lower than that of the ultra-high-molecular-weight polyethylene, which is used in the present invention, is an indispensable component for imparting an injection moldability to the ultra-high-molecular-weight polyethylene. In order to maintain the intrinsic viscosity and melt torque of the composition as a whole within the ranges specified in the present invention, it is preferred that the intrinsic viscosity $[\eta]h$, as determined according to the method described in detail hereinafter, be 0.1 to 5 dl/g, especially 0.5 to 3 dl/g. If $[\eta]h$ is too low and below the above-mentioned range, bleeding or other defect appears on the surface of the molded article, and if $[\eta]h$ exceeds the above-mentioned range, the melt flowability is degraded and the moldability of the composition as a whole tends to be degraded.

If the ultra-high-molecular-weight polyethylene is combined with the low-molecular-weight or high-molecular-weight polyethylene under specific conditions, a low friction coefficient, a low abrasion coefficient and a large critical PV value can be imparted to the composition while imparting an excellent injection moldability to the composition. First of all, the ultra-high-molecular-weight polyethylene should be present in an amount of 15 to 40% by weight, especially 20 to 35% by weight, based on the entire olefin resin composition. If the amount of the ultra-high-molecular-weight polyethylene is too small and below the above-mentioned range, the composition is inferior in the friction coefficient and abrasion resistance to the composition comprising the ultra-high-molecular-weight polyethylene in an amount within the above-mentioned range. If the amount of the ultra-high-molecular-weight polyethylene exceeds the above-mentioned range, the moldability is degraded and delamination is caused, resulting in reduction of the abrasion resistance.

This olefin composition as a whole should have an intrinsic viscosity $[\eta]c$ of 3.5 to 15 dl/g, especially 4.0 to 10 dl/g. If $[\eta]c$ is too low and below the above-mentioned range, the composition is inferior in the dynamic friction coefficient and abrasion resistance to the composition having $[\eta]c$ within the above-mentioned range. If $[\eta]c$ exceeds the above-mentioned range, both of the moldability and the abrasion resistance, due to delamination, are degraded. The melt torque T referred to in the instant specification and appended claims is a value measured at a temperature of 240° C. under a pressure of 5 kg/cm$^2$ at an amplitude of $\pm 3°$ and a frequency of 6 CPM by using JSR Curastometer (supplied by Imanaka Kikai Kogyo K. K.). An ordinary screw cannot transport a composition having a melt torque T higher than 4.5 kg.cm, and this composition cannot be injection-molded by a general-purpose injection molding machine. Accordingly, the melt torque T should be lower than 4.5 kg.cm.

The composition of the present invention comprises the above-mentioned olefin resin composition and, incorporated therein, an additive selected from the group consisting of fine particulate inorganic fillers, fibrous fillers and liquid and solid lubricants. Namely, by incorporating the above-mentioned additive into the olefin resin composition in an amount of 1 to 70% by weight based on the olefin resin composition, the injection moldability of the composition and the heat resistance, rigidity, impact resistance, self-lubricating property and abrasion resistance of the molded article can be improved without decrease of the above-mentioned characteristics inherently possessed by the olefin resin composition.

In general, in order to attain an extender effect or to improve the impact strength, heat resistance, abrasion resistance and electrically insulating property, fillers are often incorporated in molded plastic articles. In the composition of the present invention comprising an olefin resin composition comprising ultra-high-molecular-weight polyethylene and low-molecular-weight or high-molecular-weight polyethylene and a fine particulate inorganic filler, the heat resistance expressed by the heat distortion temperature is sometimes increased by more than about 40° C. as compared with that of the filler-free composition and the rigidity expressed by the flexural elastic modulus is almost doubled. Moreover, such unexpected improvements of the characteristics can be attained without substantial decrease of excellent sliding characteristics inherently possessed by the olefin resin composition, such as (1) a low abrasion coefficient, (2) a low dynamic friction coefficient and (3) a high critical PV value.

Furthermore, by incorporating a fine particulate inorganic filler into the specific olefin resin composition, the dimension stability of the injection-molded article is improved, and formation of defects often observed on injection-molded articles, such as so-called "sink mark" and "warpage", can be reduced, whereby the appearance characteristics and mechanical precision of the molded article can be improved. Moreover, the molding cycle can be shortened. Thus, prominent advantages can be attained with respect to the moldability.

It also is important that the amount incorporated to the filler should be within the above-mentioned range. If the amount incorporated of the filler is too small and below the above-mentioned range, the degree of the improvement of the heat resistance, rigidity and moldability is lower than in the molded article in which the filler is incorporated in an amount within the above-mentioned range. If the amount incorporated of the filler exceeds the above-mentioned range, the melt flowability is reduced and the injection moldability is degraded, and also the sliding characteristics of the molded article are degraded.

In the present invention, if a fibrous filler is used, the above-mentioned advantages attained by the fine particulate inorganic filler are similarly attained, and furthermore, the mechanical properties such as the tensile strength are prominently improved and also the impact strength is prominently improved.

Moreover, in the present invention, if a liquid or solid lubricant is incorporated into the above-mentioned olefin resin composition, the dynamic friction coefficient and abrasion coefficient can be further reduced without degradation of excellent characteristics inherently possessed by the olefin resin composition, such as excellent injection moldability, self-lubricating property, abrasion resistance, impact strength and mechanical strength.

The lubricant should be incorporated in an amount within the above-mentioned range. If the amount incorporated of the lubricant is too small and below the above-mentioned range, the effect of improving the dynamic friction coefficient or abrasion resistance is lower than the effect attained when the lubricant is incorporated in an amount within the above-mentioned range. If the amount incorporated of the lubricant exceeds the above-mentioned range, the mechanical strength or elastic modulus of the sliding material degrades much as compared with the sliding material in which the lubricant is incorporated in an amount within the above-mentioned range.

The present invention will now be described in detail.

OLEFIN RESIN COMPOSITION

Each of ultra-high-molecular-weight polyethylene and low-molecular-weight or high-molecular-weight polyethylene used in the present invention is a homopolymer of ethylene or a copolymer of ethylene as the main component with other α-olefin such as propylene, 1-butene, 1-pentene, 1-hexene, 1-octene, decene, 1-dodecene, 4-methyl-1-pentene or 3-methyl-1-pentene.

The olefin resin composition used in the present invention can be prepared by mixing the above-mentioned ultra-high-molecular-weight polyethylene and low-molecular-weight or high-molecular-weight polyethylene at the above-mentioned mixing ratio and melt-kneading the mixture. In order to form a homogeneous composition, it is especially preferred that a multi-staged polymerization be adopted for the preparation. More specifically, an olefin composed mainly of ethylene is polymerized in the presence of a Ziegler catalyst comprising a highly active solid titanium catalyst component and an organic aluminum compound catalyst component in the absence of hydrogen to form ultra-high-molecular-weight polyethylene, and the above-mentioned olefin is polymerized in the presence of hydrogen to form low-molecular-weight or high-molecular-weight polyethylene. A highly active solid titanium catalyst component comprising magnesium, titanium and halogen as indispensable ingredients is especially preferred.

The specific Ziegler catalyst used is a catalyst of a specific state, which is formed, in principle, of a solid titanium catalyst component and an organic aluminum compound catalyst compound. As the solid titanium catalyst component, there is preferably used, for example, a highly active, fine powdery catalyst component having a narrow particle size distribution and an average particle size of about 0.01 to about 5μ and comprising several fine spheres bonded to one another. The highly active, fine powdery titanium catalyst component having such a specific state can be prepared by strictly adjusting precipitation conditions when a solid product is precipitated by contacting a magnesium compound in the liquid state with a titanium compound in the liquid state, for example, in the preparation of a solid titanium catalyst component disclosed in Japanese Patent Application Laid-Open Specification No. 811/81. More specifically, in the process disclosed in the above-mentioned laid-open specification, a hydrocarbon solution containing magnesium chloride and a higher alcohol is mixed with titanium tetrachloride at a low temperature and the temperature is elevated to about 50° to about 100° C. to precipitate a solid product, and at this precipitation step of this process, a monocarboxylic acid ester is made present in a minute amount of about 0.01 to about 0.2 mole per mole of magnesium chloride and the precipitation is effected under a strong stirring. If necessary, the precipitated solid product may be washed with titanium tetrachloride. Thus, a solid catalyst component satisfactory in both of the activity and the particulate state can be obtained. In this catalyst component, for example, titanium is contained in an amount of about 1 to about 6% by weight, and the halogen/titanium atomic ratio is from about 5 to about 90 and the magnesium/titanium atomic ratio is from about 4 to about 50.

A fine sphere having a narrow particle size distribution and an average particle size of 0.01 to 5μ, preferably 0.05 to 3μ, which is obtained by subjecting the so-prepared solid titanium catalyst component to a shearing treatment at a high speed, can also be preferably used as the highly active, fine powdery titanium catalyst component. More specifically, for this high-speed shearing treatment, there is adopted a method in which a slurry of the solid titanium catalyst component is treated in an inert gas atmosphere for an appropriate time by using a commercially available homomixer. In this method, in order to prevent reduction of the catalystic activity, an organic aluminum compound can be added in an equimolar amount to titanium in advance. Furthermore, there can be adopted a method in which the treated slurry is filtered through a sieve to remove coarse particles. The above-mentioned highly active, fine powdery titanium catalyst component having a very fine particle size can be obtained through the foregoing methods.

As the organic aluminum compound catalyst component, there are preferably used, for example, trialkyl aluminum compounds such as triethyl aluminum and triisobutyl aluminum, dialkyl aluminum chlorides such as diethyl aluminum chloride and diisobutyl aluminum chloride, alkyl aluminum sesquichlorides such as ethyl aluminum sesquichloride, and mixtures thereof.

At the polymerization step for formation of the ultra-high-molecular-weight polyethylene, it is preferred that the highly active titanium catalyst component (A) be used in an amount of about 0.001 to about 20 milligram-atoms, especially about 0.005 to about 10 milligram-atoms, as the titanium atom per liter of the medium, and the organic aluminum compound catalyst component (B) be used in an amount corresponding to an Al/Ti atomic ratio of from about 0.1 to about 1000, especially from about 1 to about 500. The temperature adopted at the polymerization step for formation of the ultra-high-molecular-weight polyethylene is ordinarily about $-20°$ to about $120°$ C. and preferably about $0°$ to about $100°$ C. It is especially preferred that this temperature be about $5°$ to about $95°$ C. The pressure adopted for the polymerization is a pressure under which liquid phase polymerization or gas phase polymerization can be carried out at the above-mentioned polymerization temperature. For example, a pressure in the range of from atmospheric pressure to about 100 $kg/cm^2$ is generally adopted, and a pressure in the range of from atmospheric pressure to about 50 $kg/cm^2$ is preferred. The polymerization time at the polymerization step is set so that the amount of the formed ultra-high-molecular-weight polyethylene is at least about 1000 g, preferably at least about 2000 g, per milligram-atom of titanium in the highly active titanium catalyst component. In order to form the ultra-high-molecular-weight polyethylene at the polymerization step, it is preferred that the polymerization reaction be carried out in the absence of hydrogen. After the polymerization reaction, the formed polymer can be once isolated in an inert medium atmosphere and stored.

As the inert medium that can be used at the polymerization step for formation of the ultra-high-molecular-weight polyethylene, there can be mentioned, for example, aliphatic hydrocarbons such as propane, butane, pentane, hexane, heptane, octane, decane and kerosene, alicyclic hydrocarbons such as cyclopentane and cyclohexane, aromatic hydrocarbons such as benzene, toluene and xylene, halogenated hydrocarbons such as dichloroethane, methylene chloride and chlorobenzene, and mixtures thereof. Use of an aliphatic hydrocarbon is especially preferred.

In the production of the olefin resin composition of the present invention, at the polymerization step other than the polymerization step for formation of the ultra-high-molecular-weight polyethylene, the polymerization reaction of the remaining olefin is carried out in the presence of hydrogen.

At the polymerization step other than the polymerization step for formation of the ultra-high-molecular-weight polyethylene, hydrogen is fed in an amount of 0.01 to 50 moles, preferably 0.05 to 30 moles, per mole of the olefin fed at this polymerization step.

At the polymerization step other than the polymerization step for formation of the ultra-high-molecular-weight polyethylene, it is preferred that the concentrations of the respective catalyst components in the polymerization reaction liquid in the polymerization vessel be such that the above-mentioned treated catalyst is contained in an amount of about 0.001 to about 0.1 milligram-atom, preferably about 0.005 to about 0.1 milligram-atom, as the titanium atom per liter of the polymerization liquid and the Al/Ti atomic ratio in the polymerization mixture is from about 1 to about 1000, preferably from about 2 to about 500. Accordingly, the organic aluminum compound catalyst component (B) can be additionally supplied for the above-mentioned purpose. In order to adjust the molecular weight and molecular weight distribution, hydrogen, an electron donor and a halogenated hydrocarbon can be made present in the polymerization reaction mixture.

The polymerization temperature is within a range where slurry polymerization or gas phase polymerization is possible. Namely, the polymerization temperature is at least about $40°$ C., preferably about $50°$ to about $100°$ C. A polymerization pressure of from atmospheric pressure to about 100 $kg/cm^2$, especially from atmospheric pressure to about 50 $kg/cm^2$, is recommended. The polymerization time is set so that the amount of the formed polymer is at least 1000 g, preferably at least about 5000 g, per milligram-atom of titanium in the titanium catalyst component.

In the above-mentioned process, polymerization to ultra-high-molecular-weight polyethylene is carried out at the first stage and polymerization to low-molecular-weight or high-molecular-weight polyethylene is carried out at the second and subsequent stages. It will be understood that this polymerization order can be reversed.

FINE PARTICULAR INORGANIC FILLER

As the fine particulate inorganic filler (B) used in the present invention, there can be mentioned silicas such as dry method amorphous silica (Aerosil), wet method amorphous silica (white carbon), crystalline silica (cristobalite or quartz) and diatomaceous earth, aluminas such as $\alpha$-alumina, aluminum hydroxide and alumina gel (gibbsite or boehmite), aluminum silicates such as synthetic aluminum silicate (amorphous) and natural aluminum silicate (kaolin or calcined kaolin), natural magnesium silicate (talc), synthetic magnesium silicate, synthetic basic magnesium silicate, natural and synthetic smectites clay minerals (bentonite and montmorillonite), synthetic aluminosilicates (zeolite), alkaline earth metal salts such as calcium carbonate, magnesium carbonate and barium sulfate, and magnesium oxide and magnesium hydroxide.

It is generally preferred that the fine particulate inorganic filler used in the present invention should have a median diameter of 0.1 to 30 $\mu m$, particularly 0.5 to 10 $\mu m$ (Colter counter method).

The fine particulate inorganic filler is incorporated in the olefin resin composition in an amount of 1 to 70% by weight, preferably 5 to 50% by weight, especially preferably 10 to 30% by weight.

FIBROUS FILLER

Known fibrous fillers can be used as the fibrous filler (B) in the present invention without any limitation. For example, there can be mentioned a glass fiber, a carbon fiber, a boron fiber, a potassium titanate whisker, metal fibers such as a stainless steel fiber and an aluminum fiber, an aramid fiber, a polyester fiber and a polyamide fiber.

The fibrous filler has a fiber diameter of 1 to 50 $\mu m$, preferably 5 to 15 $\mu m$, and a fiber length of 1 to 10 mm, preferably 3 to 6 mm, and the aspect ratio is 200 to 10000, preferably 400 to 1200.

In the olefin resin composition of the present invention, the fibrous filler is incorporated in an amount of 1 to 70 parts by weight, preferably 3 to 50 parts by weight, especially preferably 5 to 30 parts by weight, per 100 parts by weight of the above-mentioned olefin resin composition (A) comprising the ultra-high-molecular-weight polyethylene and the low-molecular-weight or high-molecular-weight polyethylene. If the amount of the fibrous filler exceeds 70 parts by weight per 100 parts by weight of the olefin resin composition (A), the apparent melt viscosity increases and the injection moldability is degraded, and the weld strength of the molded article is degraded.

LIQUID OR SOLID LUBRICANT

Petroleum type lubricating oils and synthetic lubricating oils can be used as the liquid lubricant (B) in the present invention. As the petroleum type lubricating oil, there can be used liquid paraffin, spindle oil, freezer oil, dynamo oil, turbine oil, machine oil and cylinder oil. As the synthetic lubricating oil, there can be used synthetic hydrocarbon oil, polyglycol oil, polyphenyl ether oil, ester oil, phosphoric acid ester oil, polychlorotrifluoroethylene oil, fluoroester oil, chlorinated biphenyl oil and silicone oil.

As the lubricating oil having a good compatibility with the olefin resin composition and being especially effective for improving the lubricating property, there can be mentioned a synthetic lubricating oil composed of an ethylene/α-olefin copolymer having an ethylene content of 20 to 80 mole %, especially 30 to 70 mole %, and a number average molecular weight of 500 to 10000, especially 1000 to 5000. Propylene is preferred as the α-olefin component of this synthetic lubricating oil, but other α-olefins having up to 20 carbon atoms, especially up to 14 carbon atoms, can be used. It is preferred that the Q value (weight average molecular weight/number average molecular weight ratio) be up to 4, especially up to 3. This synthetic lubricating oil is characterized by a viscosity index of at least 120 and a dynamic viscosity of 10 to 2000 cst as measured at 100° C. The structure, characteristics and preparation process of this synthetic lubricating oil are described in detail in Japanese Patent Application Laid-Open Specifications No. 117595/82 and No. 123205/82.

As the solid lubricant or sliding filler (B), there are mainly used graphite and molybdenum disulfide. Furthermore, there can be used boron nitride, tungsten disulfide, lead oxide, glass powder and metal soap. Still further, there can be used powders of fluorine resins such as a polytetrafluoroethylene resin (PTFE), an ethylene tetrafluoride/propylene hexafluoride copolymer resin (FEP), an ethylene tetrafluoride/perfluoroalkoxyethylene copolymer resin (PFA), a trifluorochloroethylene resin (PCTFE), an ethylene tetrafluoride/ethylene copolymer resin (ETFE) and a vinylidene fluoride resin, and other polymeric lubricant such as a polyphenylene sulfide resin powder. It is preferred that the sliding filler be used in the powdery form, and it also is preferred that the particle size be 1 to 100 μm, especially 10 to 50 μm.

The solid lubricant can be used singly or in combination with a liquid lubricant. For example, the lubricant can be incorporated in the form of, for example, a powder, a sol, a gel or a suspensoid in the olefin resin composition.

It is preferred that the liquid lubricant can be incorporated in an amount of 1 to 20% by weight, especially 2 to 5% by weight, based on the olefin resin composition. It is preferred that the solid lubricant be incorporated in an amount of 1 to 70 parts by weight, especially 3 to 50 parts by weight, particularly especially 5 to 30 parts by weight, per 100 parts by weight of the olefin resin composition (A).

COMPOSITION AND MOLDING

In the present invention, the above-mentioned fine particulate inorganic filler, fibrous filler and liquid or solid lubricant can be used singly or in the form of a mixture thereof.

In the composition of the present invention, it is important that the above-mentioned additive should be dispersed in the olefin resin composition as finely and uniformly as possible. Fine dispersion can be accomplished by supplying the olefin resin composition and the additive to a single-screw or twin-screw extruding kneader and melt-kneading the mixture. Of course, known additives for olefin resins, such as an antioxidant, a release agent and a pigment, can be incorporated at this mixing and kneading step according to a known recipe.

It is one of prominent advantages of the present invention that the so-formed composition can be molded by using a general-purpose injection molding machine. The injection molding conditions are not particularly critical. However, it is generally preferred that injection molding be carried out at a cylinder temperature of 200° to 290° C. under an injection pressure of 1000 to 4000 kg/cm$^2$. Of course, injection molding can be carried out in one stage or a plurality of stages.

The composition of the present invention can be valuably used for various machine parts for which sliding characteristics are required, especially sliding parts, for example, various bearings, oilless bearings, joints, gears, cams, sliders, rollers, reels, cylinders, pistons and the like.

Since the composition of the present invention comprises, as a base material, a specific olefin resin composition comprising ultra-high-molecular-weight polyethylene and low-molecular-weight or high-molecular-weight polyethylene, the composition of the present invention can be molded into a machine part or the like at a high precision while retaining excellent characteristics inherently possessed by ultra-high-molecular-weight polyethylene. By incorporating a specific amount of a fine particulate inorganic filler into this olefin resin composition, the heat distortion temperature and flexural elastic modulus can be improved without substantial decrease of excellent characteristics of the olefin resin composition, such as a low wear coefficient, a low dynamic friction coefficient and a large critical PV value, and occurrence of "sink mark" and "warpage" can be prevented. Thus, the heat resistance, rigidity and moldability can be prominently improved.

In the case where a fibrous filler is incorporated in the olefin resin composition, the above-mentioned advantages can be similarly attained and, furthermore, the tensile strength and impact strength are highly improved.

Moreover, since the composition of the present invention comprises, as a base material, a specific olefin resin composition comprising ultra-high-molecular-weight polyethylene and low-molecular-weight or high-molecular-weight polyethlene, the composition of the present invention can be molded into a sliding part having a mechanical precision while retaining excellent self-lubricant property, abrasion resistance, impact strength inherently possessed by ultra-high-molecular-weight polyethylene and by incorporating a liquid or solid lubricant into this olefin resin composition, the dynamic friction coefficient and abrasion coefficient can be highly improved.

The present invention will now be described in detail with reference to the following examples that by no means limit the scope of the invention.

In the following examples, the physical properties were determined according to the following methods.

TENSILE TEST

The tensile test was carried out according to the method of ASTM D-638 by using a test piece of ASTM No. 4 at a tensile speed of 50 mm/min. The tensile strength (YS: kg/cm$^2$) at yield, the tensile strength (TS: kg/cm$^2$) at break and the elongation (EL: %) at break were determined.

IZOD IMPACT STRENGTH (kg-cm/cm)

The Izod impact strength was determined according to the method ASTM D-256 by using a notched test piece.

OLSEN RIGIDITY (kg/cm$^2$)

The Olsen rigidity was determined according to the method of ASTM D-747.

FLEXURAL STRENGTH (kg/cm$^2$) AND FLEXURAL ELASTIC MODULUS (kg/cm$^2$)

The flexural strength and flexural elastic modulus were determined according to the method of ASTM D-790. Heat Distortion Temperature (°C.)

The heat distortin temperature was measured under a load of 4.64 kg/cm$^2$ by using a test piece having a size of 12.7 mm×12.7 mm×127 mm and a heat distortion tester (supplied by Toyo Seiki) according to the method of ASTM D-648.

DYNAMIC FRICTION COEFFICIENT

The dynamic friction test was carried out for 30 minutes under conditions of a compression load of 7.5 kg/cm$^2$ and a slip speed of 12 m/min by using a Matsubara type frictional abrasion tester (supplied by Toyo-Boldwin). The mating material was SUS 304 and the roughness of the sliding face was adjusted to 6s. An injection-molded rectangular plate having a size of 130 mm×120 mm×2 mm was used as the test piece.

MELTING CRITICAL PV VALUE (kg/cm$^2$·m/min)

In a Matsubara type frictional abrasion tester (supplied by Toyo-Boldwin), the slip speed was adjusted to 12 m/min and the compression load was elevated from 2.5 kg/cm$^2$ to 25 kg/cm$^2$ stepwise at an interval of 2.5 kg/cm$^2$, and a resin was maintained for 30 minutes under each compression load and the PV value (load×speed) at which the resin was molten by heat of friction was measured. The mating material was SUS 304 and the roughness of the sliding face was adjusted to 6s. An injection-molded rectangular plate having a size of 130 mm×120 mm×2 mm was used as the test piece.

FRICTIONAL ABRASION TEST

The frictional abrasion test was carried out for 168 hours under conditions of a compression load of 3.4 kg/cm$^2$ and a slip speed of 30 m/min by using a Matsubara type frictional abrasion tester (supplied by Toyo-Boldwin) and the abrasion coefficient (x 10$^{-10}$ cm$^3$/kg·m) was determined. The mating material was SUS 304 and the roughness of the sliding face was adjusted to 6s. An injection-molded rectangular plate having a size of 130 mm×120 mm×2 mm was used as the test piece.

MOLDING SHRINKAGE (%)

The length and width of an injection-molded rectangular plate having a size of 130 mm×120 mm×2 mm were measured and the shrinkage of the molded article was determined based on the size of a mold according to the following formula:

$$\text{Shrinkage (\%)} = \frac{\left(\begin{array}{c}\text{size of}\\\text{mold}\end{array}\right) - \left(\begin{array}{c}\text{size of}\\\text{molded article}\end{array}\right)}{\text{size of mold}} \times 100$$

INTRINSIC VISCOSITY [η]H OF LOW-MOLECULAR-WEIGHT OR HIGH-MOLECULAR-WEIGHT POLYETHYLENE IN OLEFIN RESIN COMPOSITION (1) The density du of the ultra-high-molecular-weight polyethylene and the density dc of the olefin resin composition were measured, and the density dh of the low-molecular-weight or high-molecular-weight polyethylene were determined according to the following formula:

$$\frac{a}{du} + \frac{b}{dh} = \frac{1}{dc}$$

wherein dh, dc and du are as defined above and a and b represent weight ratios of the ultra-high-molecular-weight polyethylene and the low-molecular-weight or high-molecular-weight polyethylene in the olefin resin composition, respectively.

(2) Various low-molecular-weight or high-molecular-weight polyethylene differing in the intrinsic viscosity were prepared under the same conditions (inclusive of the monomer composition and the catalyst) as adopted for the production of the low-molecular-weight or high-molecular-weight polyethylene, the density dh of which was measured, except that the hydrogen partial pressure was changed, and with respect to the obtained polyethylenes, the relation between the intrinsic viscosity [η] and the density was determined.

The density dh, obtained in (1) above, of the low-molecular-weight or high-molecular-weight polyethylene was regarded as the density satisfying the so-determined relation, and the corresponding intrinsic viscosity [η]h was determined from this relation.

(3) The density of each sample was determined according to the following procedures. Two sets of laminates comprising an aluminum sheet (3 mm×300 mm×300 mm mm), an asbestos sheet (5 mm×250 mm×250 mm), a stainless steel sheet (3 mm×220 mm×220 mm) and a polyester film, which were piled in this order, were prepared. One set of the laminate was placed on a pressing face of a press molding machine so that the polyester film was located above, a molding flame (2 mm×200 mm×200 mm) was placed on this plate, and the other laminate was placed on the molding frame so that the polyester film was located below.

The sample was charged in the molding frame and the sample was molten at 190°±3° C. under a pressureless condition for 8 minutes and was then molded under a pressure of 300 kg/cm$^2$ for 5 minutes. Then, the sample was cooled to 60° C. at a cooling speed of 15°±2° C. and the sample was taken out. The sample was held in a thermostat oil tank maintained at 120°±0.2° C. for 1 hour, and the sample was cooled to room temperature at a cooling speed of 1.5° C./min. Then, the sample was taken out and allowed to stand still at room temperature for 1 hour, and the density of the sample was measured according to the density gradient method (ASTM D-1505).

The following examples illustrate the preparation of the olefin resin composition.

EXAMPLE A

Preparation of Catalyst

A homogeneous solution was prepared by heating and reacting 47.6 g (0.5 mole) of anhydrous magnesium chloride, 0.25 l of decalin and 0.23 l (1.5 moles) of 2-ethylhexyl alcohol at 130° C. for 2 hours, and 7.4 ml (50 millimoles) of ethyl benzoate was added to the solution. The homogeneous solution was dropped with stirring into 1.5 l of TiCl$_4$ maintained at $-5°$ C. over a period of 1 hour. A separable glass flask having a capacity of 3 liters was used as the reaction vessel, and the stirring speed was adjusted to 950 rpm. After completion of the dropwise addition, the temperature was elevated to 90° C. and reaction was carried out at 90° C. for 2 hours. After termination of the reaction, the solid portion was collected by filtration and sufficiently washed with hexane to obtain a highly active, fine powdery titanium catalyst component. The catalyst component contained 3.8% by weight of the titanium atom.

Polymerization

Continuous polymerization was carried out by using a continuous two-staged polymerization apparatus comprising two polymerization tanks having an inner volume of 220 l, which were connected to each other in series. To the first-stage polymerization tank (hereinafter referred to as "polymerization tank 1") of the continuous two-stage polymerization apparatus was added 130 l of n-hexane, and the temperature was elevated to 40° C. Then, n-hexane at 35 l/hr, triethyl aluminum at 45 mM/hr, the titanium catalyst component at 1.0 milligram-atom/hr as the titanium atom and ethylene gas at 6.0 Nm$^3$/hr were continuously introduced into the polymerization tank 1. The polymerization mixture slurry in the polymerization tank 1 was fed to the second-stage polymerization tank (hereinafter referred to as "polymerization tank 2") by means of a pump so that the volume of the reaction mixture was always 130 l. The polymerization pressure in the polymerization tank 1 was 4.8 kg/cm$^2$ G.

In addition to the polymerization mixture slurry fed from the polymerization tank 1, n-hexane at 25 l/hr and ethylene gas at 18 Nm$^3$/hr were continuously introduced into the polymerization tank 2. Hydrogen gas was appropriately introduced so that the ethylene/hydrogen molar ratio in the gas phase in the polymerization tank 2 was 1000/30. The slurry formed by the polymerization reaction was intermittently withdrawn from the bottom of the polymerization tank 2 by using a timer valve so that the level of the polymerization tank 2 was maintained at 120 l. The polymerization temperature in the polymerization tank 2 was 65° C., and the polymerization pressure was 4 kg/cm$^2$ G. The obtained polymer was separated from the solvent by a centrifugal separator and dried in an N$_2$ current.

Then, [η] and the content of each component of the obtained olefin resin composition, and [η] and the melt torque T of the composition were measured according to the following methods.

The intrinsic viscosity [η] was measured in decalin as the solvent at 135° C.

The melt torque T was expressed by the torque of the sample in the molten state, which was measured at a temperature of 240° C. under a pressure of 5 kg/cm$^2$ at an amplitude of ±3° and a vibration number of 6 cpm by using JSR Curastometer (supplied by Imanaka Kikai Kogyo).

It was found that the intrinsic viscosity [η]c of the olefin resin composition was 5.5 dl/g and the melt torque T of the olefin resin composition was 1.3 kg·cm.

EXAMPLE B

Preparation of Catalyst

A homogeneous solution was prepared by heating and reacting 47.6 g (0.5 mole) of anhydrous magnesium chloride, 0.25 l of decalin and 0.23 l (1.5 moles) of 2-ethylhexyl alcohol at 130° C. for 2 hours, and 7.4 ml (50 millimoles) of ethyl benzoate was added to the solution. The homogeneous solution was dropped with stirring into 1.5 l of TiCl$_4$ maintained at $-5°$ C. over a period of 1 hour. A separable glass flask having a capacity of 3 liters was used as the reaction vessel, and the stirring speed was adjusted to 950 rpm. After completion of the dropwise addition, the temperature was elevated to 90° C. and reaction was carried out 90° C. for 2 hours. After termination of the reaction, the solid portion was collected by filtration and sufficiently washed with hexane to obtain a highly active, fine powdery titanium catalyst component. The catalyst component contained 3.8% by weight of the titanium atom.

Polymerization

Continuous polymerization was carried out by using a continuous two-staged polymerization apparatus comprising two polymerization tanks having an inner volume of 220 l, which were connected to each other in series. To the first-stage polymerization tank (hereinafter referred to as "polymerization tank 1") of the continuous two-staged polymerization apparatus was added 130 l of n-hexane, and the temperature was elevated to 60° C. Then, n-hexane at 35 l/hr, triethyl aluminum at 45 mM/hr, the titanium catalyst component at 1.0 milligram-atom/hr as the titanium atom and ethylene gas at 4.3 Nm$^3$/hr were continuously introduced into the polymerization tank 1. The polymerization mixture slurry in the polymerization tank 1 was fed to the second-stage polymerization tank (hereinafter referred to as "polymerization tank 2") by means of a pump so that the volume of the reaction mixture was always 130 l. The polymerization pressure in the polymerization tank 1 was 4.7 kg/cm$^2$G.

In addition to the polymerization mixture slurry fed from the polymerization tank 1, n-hexane at 25 l/hr and ethylene gas at 11.2 Nm$^3$/hr were continuously introduced into the polymerization tank 2. Hydrogen gas was appropriately introduced so that the ethylene/hydrogen molar ratio in the gas phase in the polymerization tank 2 was 1000/30. The slurry formed by the polymerization reaction was intermittently withdrawn from the bottom of the polymerization tank 2 by using a timer valve so that the level of the polymerization tank 2 was maintained at 120 l. The polymerization temperature in the polymerization tank 2 was 85° C., and the polymerization pressure was 7.2 kg/cm$^2$ G. The obtained polymer was separated from the solvent by a centrifugal separator and dried in an $N_2$ current.

Then, $[\eta]$ and the content of each component of the obtained olefin resin composition, and $[\eta]$ and the melt torque T of the composition were measured according to the following methods.

The intrinsic viscosity $[\eta]$ was measured in decalin as the solvent 135° C.

The melt torque T was expressed by the torque of the sample in the molten state, which was measured at a temperature of 240° C. under a pressure of 5 kg/cm² at an amplitude of 3° and a vibration number of 6 cpm by using JSR Curastometer (supplied by Imanaka Kikai Kogyo).

It was found that the intrinsic viscosity $[\eta]c$ of the olefin resin composition was 5.4 dl/g and the melt torque T of the olefin resin composition was 1.4 kg·cm.

EXAMPLE 1

Sample 1

By a Henschel mixer, 100 parts by weight of the olefin resin composition obtained in Example A, which had $[\eta]c$ of 5.5 dl/g, a density of 0.968 g/cc and a melt torque T of 1.3 kg·cm was mixed with 10 parts by weight of talc having an average particle size of 1.75 μm (Hi-Filler #5000PJ supplied by Matsumura Sangyo) as the inorganic filler, and the mixture was pelletized by a single-screw extruder and various test pieces were formed by an injection molding machine (Model IS-50 supplied by Toshiba Kikai) under the following conditions.

Injection Molding Conditions

Cylinder temperature (°C.): 200/230/270/270
Injection pressure (kg/cm²): primary/secondary=1200/800
Screw revolution (rpm): 97
Mold temperature (°C.): 27 (water-cooled)
The obtained results are shown in Table 1.

Sample 2

The procedures for formation of sample 1 were repeated in the same manner except that the amount filled of talc was changed to 30 parts by weight.

Sample 3

The procedures for formation of sample 1 were repeated in the same manner except that the olefin resin composition (A) in which the filler was not incorporated was used.

Sample 4

The procedures for formation of sample 1 were repeated in the same manner except that the amount filled of talc was changed to 80 parts by weight and the mixture was pelletized by a twin-screw extruder.

Since the amount filled of talc was too large, the sliding characteristics were drastically degraded, and it was found that the composition was not suitable for practical use.

The obtained results are shown in Table 1.

TABLE 1

| Sample NO. | 1 | 2 | 3 | 4 |
|---|---|---|---|---|
| Amount (parts by weight) of Filled Talc | 10 | 30 | 0 | 80 |
| Heat Distortion Temperature (°C.) (4.64 kg/cm²) | 94 | 121 | 80 | 127 |
| Flexural Elastic Modulus (kg/cm²) | 23000 | 33000 | 17000 | 40500 |
| Dynamic Friction Coefficient | 0.19 | 0.27 | 0.15 | 0.51 |
| Melting Critical PV Value (kg/cm² · m/min) | 420 | 330 | 450 | 120 |
| Abrasion Coefficient ($10^{-10}$ cm³/kg · m) | 180 | 230 | 160 | 450 |
| Shrinkage (%) | | | | |
| length | 1.3 | 0.9 | 1.6 | 1.2 |
| width | 1.2 | 0.9 | 1.5 | 1.0 |

EXAMPLE 2

Sample 1

By a Henschel mixer, 100 parts by weight of the olefin resin composition obtained in Example A, which had $[\eta]c$ of 5.5 dl/g, a density of 0.968 g/cc and a melt torque T of 1.3 kg/cm was mixed with 2 parts by weight of an ethylene/α-olefin copolymer synthetic oil having a molecular weight of 1300 and a dynamic viscosity of 100 cst as measured at 100° C. (Lucant HC-100 supplied by Mitsui Petrochemical Industries, Ltd.) as the liquid lubricant, and the mixture was pelletized by a single-screw extruder, and a rectangular plate having a size of (130 mm×120 mm×2 mm) was formed by using an injection molding machine (Model IS-50 supplied by Toshiba Kikai) under the following conditions and the plate was machined to prepare a test piece.

Injection Molding Conditions

Cylinder temperature (°C.): 200/230/270/270
Injection pressure (kg/cm²): primary/secondary=1000/800
Screw revolution (rpm): 97
Mold temperature (°C.): 27 (water-cooled)

Sample 2

The procedures for formation of sample 1 were repeated in the same manner except that the amount incorporated of the lubricating oil was changed to 10 parts by weight.

Sample 3

The procedures for formation of sample 1 were repeated in the same manner except that the amount incorporated of the lubricating oil was changed to 0.3 part by weight.

Since the amount of the lubricating oil was too small, no substantial improvement of the sliding characteristics was observed.

Sample 4

The procedures for formation of sample 1 were repeated in the same manner except that 2 parts by weight of graphite having a carbon content of 99.0%, an average particle size of 6 μm, a specific surface area of 15$N_2$ m²/g and a bulk density of 0.18 g/cc (ACP #1000 supplied by Nippon Kogyo) was used as the solid lubricant.

Sample 5

The procedures for formation of sample 4 were repeated in the same manner except that the amount incorporated of graphite was changed to 10 parts by weight.

Sample 6

The procedures for formation of sample 4 were repeated in the same manner except that the amount incorporated of graphite was changed to 0.3 part by weight.

Since the amount of the graphite was too small, no substantial improvement of the sliding characteristics was observed.

Example 7

The procedures for formation of sample 1 were repeated in the same manner except that the olefin resin composition A in which the lubricant was not incorporated was used.

The obtained results are shown in Table 2.

TABLE 2

| Sample No. | Flexural Strength (kg/cm$^2$) | Flexural Modulus (kg/cm$^2$) | Dynamic Friction Coefficient | Abrasion Coefficient ($\times 10^{-10}$ cm$^3$/kg · cm) |
|---|---|---|---|---|
| 1 | 410 | 13000 | 0.12 | 150 |
| 2 | 340 | 9000 | 0.10 | 120 |
| 3 | 440 | 17000 | 0.15 | 160 |
| 4 | 450 | 16000 | 0.14 | 160 |
| 5 | 470 | 19000 | 0.12 | 200 |
| 6 | 450 | 17000 | 0.15 | 160 |
| 7 | 450 | 17000 | 0.15 | 160 |

EXAMPLE 3

Sample 1

By a Henschel mixer, 100 parts by weight of the olefin resin composition obtained in Example B was mixed with 0.1 part of weight of tetrakis(methylene(3,5-di-tert-butyl-4-hydroxy)hydrocinnamate)methane (Irganox 1010 supplied by Nippon Ciba-Geigy) as the additive, 0.1 part by weight of tetrakis(2,4-di-tert-butylphenyl)-4,4-biphenylene diphosphite (Sandostab P-EPQ supplied by Sandoz) as the additive, 0.12 part of weight of calcium stearate (supplied by Nippon Yushi) as the additive and 20 parts by weight of a glass fiber (CS6PE-921 supplied by Nitto Boseki) as the fibrous filler, and the mixture was supplied to a twin-screw extruder having an L/D ratio of 28 and a diameter of 45 mm and kneaded and granulated by passing the mixture through the extruder once at 220° C. and 100 rpm. The formed pellet was molded into a rectangular plate having a size of 130 mm×120 mm×2 mm by using an injection molding machine (Model IS-50 supplied by Toshiba Kikai) under the following conditions. The molded plate was machined to form a test piece.

Injection Molding Conditions

Cylinder temperature (°C.): 200/230/270/270
Injection pressure (kg/cm$^2$): primary/secondary=1000/800
Cycle (sec): primary/secondary/cooling=5/3/25
Injection speed: 2/10
Screw revolution (rpm): 97
Mold temperature (°C.): 32 (water-cooled)

The obtained results are shown in Table 3.

Samples 2 and 3

The procedures for formation of sample 1 were repeated in the same manner except that the amount used of the glass fiber was changed to 10 parts by weight or 30 parts by weight.

The obtained results are shown in Table 3.

Sample 4

The procedures for formation of sample 1 were repeated in the same manner except that 20 parts by weight of a carbon fiber (Kureka Chop C-103 supplied by Kureha Kagaku Kogyo) was used as the fibrous filler.

The obtained results are shown in Table 3.

Samples 5 and 6

The procedures for formation of sample 1 were repeated in the same manner except that the amount of the glass fiber was changed to 0 or 80 parts by weight.

The obtained results are shown in Table 3.

TABLE 3

| Sample No. | 1 | 2 | 3 | 4 | 5 | 6 |
|---|---|---|---|---|---|---|
| olefin resin composition ($\eta$) (dl/g) | 5.4 | 5.4 | 5.4 | 5.4 | 5.4 | 5.4 |
| melt torque (kg · cm) | 1.4 | 1.4 | 1.4 | 1.4 | 1.4 | 1.4 |
| glass fiber (parts by weight) | 20 | 10 | 30 | — | — | 80 |
| carbon fiber (parts by weight) | — | — | — | 20 | — | — |
| tensile stress at yield (YS) (kg/cm$^2$) | | | | | 330 | injection molding impossible |
| tensile strength at break (TS) (kg/cm$^2$) | 660 | 550 | 940 | 740 | 170 | |
| elongation at break (EL) (%) | 3 | 5 | 3 | 3 | 260 | |
| Izod impact strength (kg · cm/cm) | 22.1 | 16.6 | 26.4 | 25.3 | 6 | |
| olsen rigidity (kg/cm$^2$) | 16300 | 14000 | 21500 | 18000 | 11300 | |
| heat distortion temperature (°C.) (18.6 kg/cm$^2$) | 82 | 75 | 93 | 86 | 46 | |
| friction coefficient ($\mu$) | 0.22 | 0.19 | 0.31 | 0.25 | 0.15 | |
| abrasion loss (mg) | 0.9 | 0.7 | 1.4 | 1.10 | 0.5 | |

EXAMPLE 4

Sample 1

By a Henschel mixer, 100 parts by weight of the olefin resin composition obtained in Example B was mixed with 0.1 part of weight of tetrakis(methylene(3,5-di-tert-butyl-4-hydroxy)hydrocinnamate)methane (Irganox 1010 supplied by Nippon Ciba-Geigy) as the additive, 0.1 part by weight of tetrakis(2,4-di-tert-butyl-phenyl)-4,4-biphenylene diphosphite (Sandostab P-EPQ supplied by Sandoz) as the additive, 0.12 part by weight of calcium stearate (supplied by Nippon Yushi) as the additive, and 10 parts by weight of a graphite powder (CSP supplied by Nippon Kokuen Kogyo) as the sliding filler, and the mixture was supplied to a single-screw-extruder having an L/D ratio of 28 and a diameter of 25 mm and kneaded and granulated by passing the mixture through the extruder once at 190° C. and 50 rpm. The formed pellet was molded into a rectangular plate having a size of 130 mm × 120 mm × 2 mm by using an injection molding machine (Model IS-50 supplied by Toshiba Kikai) under the following conditions. The molded plate was machined to form a test piece.

Injection Molding Conditions

Cylinder temperature (°C.): 200/230/270/270
Injection pressure (kg/cm$^2$): primary/secondary = 1000/800
Cycle (sec): primary/secondary/cooling = 5/3/25
Injection speed: 2/10
Screw revolution (rpm): 97
Mold temperature (°C.): 32 (water-cooled)
The obtained results are shown in Table 4.

Sample 2

The procedures for formation of sample 1 were repeated in the same manner except that 10 parts by weight of a powder of PTFE (Teflon TFE-T-TA-J supplied by Mitsui-Du Pont Fluorochemical) was used as the sliding filler.
The obtained results are shown in Table 4.

Samples 3 and 4

The procedures for formation of sample 1 were repeated in the same manner except that the amount of the graphite powder was changed to 0 or 80 parts by weight.
The obtained results are shown in Table 4.

TABLE 4

| Sample No. | 1 | 2 | 3 | 4 |
|---|---|---|---|---|
| olefin resin composition ($\eta$) (dl/g) | 5.4 | 5.4 | 5.4 | 5.4 |
| melt torque (kg · cm) | 1.4 | 1.4 | 1.4 | 1.4 |
| sliding filler graphite powder (parts by weight) | 10 | — | — | 80 |
| PTFE powder (parts by weight) | — | 10 | — | — |
| tensile stress at yield (YS) (kg/cm$^2$) | 240 | 210 | 330 | injection molding impossible |
| tensile strength at break (TS) (kg/cm$^2$) | 110 | 120 | 170 | |
| elongation at break (EL) (%) | 90 | 120 | 260 | |
| Izod impact strength (kg · cm/cm) | 7 | 4 | 6 | |
| olsen rigidity (kg/cm$^2$) | 13000 | 9200 | 11300 | |
| friction ($\mu$) | 0.11 | 0.12 | 0.15 | |
| abrasion loss (mg) | 0.3 | 0.7 | 0.5 | |

We claim:

1. A method for producing a molded article, which comprises injection-molding an olefin resin composition comprising (A) an olefin resin composition comprising ultra-high-molecular-weight polyethylene having an intrinsic viscosity of more than 15 dl/g up to 40 dl/g as measured in decalin as the solvent at 135° C. and low-molecular-weight or high-molecular-weight polyethylene having an intrinsic viscosity lower than that of the ultra-high-molecular-weight polyethylene in which the ultra-high-molecular-weight polyethylene is present in an amount of 15 to 40% by weight based on the sum of both of the polyethylenes and the two polyethylenes as a whole have an intrinsic viscosity ($\eta$)c of at least 3.5 and less than 10 dl/g and a melt torque T lower than 4.5 kg-cm, and (B) 1 to 70% by weight, based on the olefin resin composition, of an additive selected from the group consisting of fine particulate inorganic filler, fibrous filler, liquid lubricants, solid lubricants and mixtures thereof.

2. A method as set forth in claim 1, wherein the low-molecular-weight or high-molecular-weight polyethylene in the olefin resin composition (A) has an intrinsic viscosity ($\eta$)h of 0.1 to 5 dl/g.

3. A method as set forth in claim 1, wherein the ultra-high-molecular-weight polyethylene is present in an amount of 20 to 35% by weight in the olefin resin composition (A).

4. A method as set forth in claim 1, wherein the additive (B) is a fine particulate inorganic filler.

5. A method as set forth in claim 4, wherein the fine particulate inorganic filler has a median diameter of 0.1 to 30 $\mu$m.

6. A method as set forth in claim 4, wherein the fine particulate inorganic filler is talc.

7. A method as set forth in claim 4, wherein the fine particulate inorganic filler is present in an amount of 5 to 50% by weight, based on the olefin resin composition.

8. A method as set forth in claim 4, wherein the fibrous filler is composed of inorganic or organic fibers.

9. A method as set forth in claim 8, wherein the inorganic or organic fibers have a fiber diameter of 1 to 50 $\mu$m and a fiber length of 1 to 10 mm.

10. A method as set forth in claim 8, wherein the fibrous filler is comprised of glass fibers or carbon fibers.

11. A method as set forth in claim 8, wherein the fibrous filler is present in an amount of 3 to 50% by weight.

12. A method as set forth in claim 1, wherein the additive (B) is a liquid lubricant.

13. A method as set forth in claim 12, wherein the liquid lubricant is a petroleum type lubricating oil or synthetic lubricating oil.

14. A method as set forth in claim 12, wherein the liquid lubricant is a synthetic lubricating oil composed of an ethylene/$\alpha$-olefin copolymer having an ethylene content of 20 to 80 mole % and a number average molecular weight of 500 to 10000.

15. A method as set forth in claim 12, wherein the liquid lubricant is present in an amount of 1 to 20% by weight.

16. A method as set forth in claim 1, wherein the additive (B) is a solid lubricant.

17. A method as set forth in claim 16, wherein the solid lubricant is a powder having a particle size of 1 to 100 $\mu$m.

18. A method as set forth in claim 16, wherein the solid lubricant is a powder of graphite or polytetrafluoroethylene.

19. A method as set forth in claim 16, wherein the solid lubricant is present in an amount of 3 to 50% by weight.

20. A method as set forth in claim 1, wherein injection molding is carried out at a cylinder temperature of 200° to 290° C. under an injection pressure of 1000 to 4000 kg/cm².

21. A method as set forth in claim 1, which further comprises preparing the olefin resin composition by multi-stage polymerization of an olefin composed mainly of ethylene.

22. A method as set forth in claim 1, which further comprises preparing the olefin resin composition by melt-kneading a mixture of the ultra-high-molecular-weight polyethylene and low-molecular-weight or high-molecular-weight polyethylene.

23. A method as set forth in claim 1, wherein the ultra-high-molecular-weight polyethylene has an intrinsic viscosity $(\eta)u$ of more than 15 dl/g and the olefin resin composition as a whole has an intrinsic viscosity $(\eta)c$ of from 4.0 to less than 10 dl/g.

24. A method of producing a slidable molded article, which comprises injection-molding an olefin resin composition comprising ultra-high-molecular-weight polyethylene having an intrinsic viscosity of more than 15 dl/g up to 40 dl/g as measured in decalin as the solvent at 135° C. and low-molecular-weight or high-molecular-weight polyethylene having an intrinsic viscosity lower than that of the ultra-high-molecular-weight polyethylene, in which the ultra-high-molecular-weight polyethylene is present in an amount of 15 to 40% by weight based on the sum of both of the polyethylenes and the two polyethylenes as a whole have an intrinsic viscosity $(\eta)c$ of at least 3.5 and less than 10 dl/g and a melt torque T lower than 4.5 kg cm, and (B) 1 to 70% by weight, based on the olefin resin composition, of a liquid or solid lubricant.

* * * * *